US012470129B2

(12) United States Patent
Mesa et al.

(10) Patent No.: US 12,470,129 B2
(45) Date of Patent: *Nov. 11, 2025

(54) OUTPUT OVERVOLTAGE PROTECTION FOR A TOTEM POLE POWER FACTOR CORRECTION CIRCUIT

(71) Applicant: SEMICONDUCTOR COMPONENTS INDUSTRIES, LLC, Scottsdale, AZ (US)

(72) Inventors: Armando Gabriel Mesa, Tempe, AZ (US); Ajay Hari, Scottsdale, AZ (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,320

(22) Filed: May 20, 2024

(65) Prior Publication Data

US 2024/0313643 A1 Sep. 19, 2024

Related U.S. Application Data

(63) Continuation of application No. 17/659,250, filed on Apr. 14, 2022, now Pat. No. 12,003,171.

(60) Provisional application No. 63/180,506, filed on Apr. 27, 2021.

(51) Int. Cl.

*H02M 1/32* (2007.01)
*H02M 1/42* (2007.01)
*H02M 1/44* (2007.01)

(52) U.S. Cl.

CPC ........... *H02M 1/4225* (2013.01); *H02M 1/32* (2013.01); *H02M 1/44* (2013.01)

(58) Field of Classification Search

CPC .. H02M 1/42225; H02M 1/4208; H02M 1/32; H02M 1/44

See application file for complete search history.

(56) References Cited

U.S. PATENT DOCUMENTS

| | | | | |
|---|---|---|---|---|
| 10,193,437 | B1 | 1/2019 | Hari et al. | |
| 10,432,086 | B1 | 10/2019 | Kamath | |
| 11,323,023 | B2 | 5/2022 | Yamane | |
| 12,003,171 | B2 * | 6/2024 | Mesa ...................... | H02M 1/44 |
| 2012/0069615 | A1 | 3/2012 | Tomioka | |

(Continued)

OTHER PUBLICATIONS

ON Semiconductor, “CrM Totem Pole PFC IC, Totem Pole CrM Power Factor Correction Controller,” Semiconductor Components Industries, LLC datasheet, Jun. 2021.

*Primary Examiner* — Adolf D Berhane

(74) *Attorney, Agent, or Firm* — Brake Hughes Bellermann LLP

(57) ABSTRACT

During a light load (or no-load) operation of a totem pole power factor correction circuit (i.e., PFC), a pulse width modulation (PWM) controller can operate in a skip mode. Further, the PWM controller may disable portions of the PFC to reduce standby power consumption. In this mode, and in this disabled configuration, the output of the PFC may be peak charged over time to a voltage that could be damaging or destructive. This peak charging results from the PFC circuit's inability to fully charge/discharge EMI capacitors between half cycles of the input line voltage. The present disclosure provides circuits and methods to fully charge/discharge the EMI capacitors to prevent peak charging the output.

20 Claims, 5 Drawing Sheets

(56) References Cited

U.S. PATENT DOCUMENTS

| | | | | |
|---|---|---|---|---|
| 2020/0014296 | A1 | 1/2020 | Guo et al. | |
| 2021/0313875 | A1 | 10/2021 | Messina et al. | |
| 2023/0198381 | A1 * | 6/2023 | Chin | H02M 1/32 363/127 |
| 2024/0014731 | A1 | 1/2024 | Chin et al. | |

* cited by examiner

OUTPUT OVERVOLTAGE PROTECTION FOR A TOTEM POLE POWER FACTOR CORRECTION CIRCUIT

CROSS-REFERENCE TO RELATED APPLICATION

This application is a continuation of U.S. application Ser. No. 17/659,250, filed on Apr. 14, 2022, and claims the benefit of U.S. Provisional Application No. 63/180,506, filed on Apr. 27, 2021. Each of these applications is incorporated by reference in its entirety.

FIELD OF THE DISCLOSURE

The present disclosure relates to power control electronics and more specifically to a totem pole power factor correction circuit.

BACKGROUND

A power factor correction (PFC) circuit can be configured to receive an AC line voltage at its input and generate a regulated DC voltage at its output. The PFC circuit may use switches toggled at a pulse width modulation (PWM) frequency for power conversion and may further include circuitry for rectification. The circuitry for rectification can include switches, toggled according to a polarity of an AC line voltage. The PFC circuit having switches for power conversion and rectification is referred to as a totem pole PFC circuit.

SUMMARY

In some aspects, the techniques described herein relate to a method for controlling a power factor correction (PFC) circuit, the method including: detecting that an input voltage is in a first half cycle having a first polarity; applying a PWM signal to a first transistor of a fast-leg portion of the PFC circuit for a conversion process corresponding to the first half cycle; detecting that the input voltage is at a first polarity change; pausing the PWM signal; and applying a pulse sequence to a second transistor of the fast-leg portion of the PFC circuit to change a voltage on an EMI capacitor from a first voltage corresponding to the first half cycle to a second voltage corresponding to a second half cycle having a second polarity opposite the first polarity.

In some aspects, the techniques described herein relate to a method for controlling a power factor correction (PFC) circuit, wherein: at the first polarity change the input voltage changes from a positive voltage to a negative voltage; and the pulse sequence is applied on the second transistor to change the voltage on the EMI capacitor from approximately a ground voltage to approximately a bulk voltage at an output of the PFC circuit.

In some aspects, the techniques described herein relate to a method for controlling a power factor correction (PFC) circuit, further including: after the pulse sequence, applying the PWM signal to the second transistor of the fast-leg portion of the PFC circuit for a conversion process corresponding to the second half cycle; detecting that the input voltage is at a second polarity change; pausing the PWM signal; and applying the pulse sequence to the first transistor of the fast-leg portion of the PFC circuit to change the voltage on the EMI capacitor from the second voltage corresponding to the second half cycle to the first voltage corresponding to the first half cycle.

In some aspects, the techniques described herein relate to a method for controlling a power factor correction (PFC) circuit, wherein: at the second polarity change the input voltage changes from a negative voltage to a positive voltage; and the pulse sequence is applied on the first transistor to change the voltage on the EMI capacitor from approximately a bulk voltage at an output of the PFC circuit to approximately a ground voltage.

In some aspects, the techniques described herein relate to a method for controlling a power factor correction (PFC) circuit, wherein the pulse sequence includes a plurality of pulses having substantially equal duty cycles.

In some aspects, the techniques described herein relate to a method for controlling a power factor correction (PFC) circuit, wherein an ON period for each pulse of the plurality of pulses increases in succession in the pulse sequence.

In some aspects, the techniques described herein relate to a method for controlling a power factor correction (PFC) circuit, wherein the pulse sequence includes four pulses and has a duration of less than 100 microseconds.

In some aspects, the techniques described herein relate to a method for controlling a power factor correction (PFC) circuit, wherein the pulse sequence includes a first delay for a first period before the pulse sequence starts and a second delay for a second period after the pulse sequence ends.

In some aspects, the techniques described herein relate to a method for controlling a power factor correction (PFC) circuit, wherein the conversion process is a skip-mode conversion.

In some aspects, the techniques described herein relate to a method for controlling a power factor correction (PFC) circuit, wherein: the EMI capacitor is coupled to a slow-leg node of a slow-leg portion of the PFC circuit; and the voltage on the EMI capacitor is the voltage at the slow-leg node, the slow-leg node further coupled to a first slow-leg transistor and a second slow-leg transistor.

In some aspects, the techniques described herein relate to a method for controlling a power factor correction (PFC) circuit, further including: detecting a light-load condition at an output of the PFC circuit; and disabling the slow leg portion of the PFC circuit by transmitting OFF switching signals to the first slow-leg transistor and the second slow-leg transistor.

In some aspects, the techniques described herein relate to a method for controlling a power factor correction (PFC) circuit, wherein: the light-load condition is detected at the output of the PFC circuit when a load has been decoupled from the output of the PFC circuit.

In some aspects, the techniques described herein relate to a method for controlling a power factor correction (PFC) circuit, wherein each pulse in the pulse sequence incrementally changes the voltage on the EMI capacitor from the first voltage to the second voltage.

In some aspects, the techniques described herein relate to a power factor correction (PFC) system including: an alternating current (AC) source configured to output a line voltage that changes a polarity at half cycles; a PFC circuit configured to receive the line voltage at an input and having a fast-leg portion; and a controller configured to: detect that the line voltage received at the PFC circuit is in a negative half cycle; transmit a PWM signal to a first transistor of the fast-leg portion of the PFC circuit for a conversion process corresponding to the negative half cycle, the conversion process generating a bulk voltage at an output of the PFC circuit; detect that the line voltage is at a first polarity change; pause the PWM signal; and transmit a pulse sequence to a second transistor of the fast-leg portion of the PFC circuit to change a voltage on an EMI capacitor from a first voltage corresponding to the negative half cycle to a second voltage corresponding to a positive half cycle.

In some aspects, the techniques described herein relate to a power factor correction (PFC) system, wherein the first voltage corresponding to the negative half cycle is approximately the bulk voltage and the second voltage corresponding to the positive half cycle is approximately a ground voltage.

In some aspects, the techniques described herein relate to a power factor correction (PFC) system, wherein the controller is further configured to: after the pulse sequence, transmit the PWM signal to the second transistor of the fast-leg portion of the PFC circuit for a conversion process corresponding to the positive half cycle; detect that the line voltage is at a second polarity change; pause the PWM signal; and transmit the pulse sequence to the first transistor of the fast-leg portion of the PFC circuit to change the voltage on the EMI capacitor from the second voltage corresponding to the positive half cycle to the first voltage corresponding to the negative half cycle.

In some aspects, the techniques described herein relate to a power factor correction (PFC) system, wherein: the first transistor of the fast-leg portion is coupled between a positive output of the PFC circuit and a fast-leg switch node; the second transistor of the fast-leg portion is coupled between the fast-leg switch node and a negative output of the PFC circuit; and the fast-leg switch node is coupled to the AC source via an inductor.

In some aspects, the techniques described herein relate to a power factor correction (PFC) system, wherein the PFC circuit further includes: a slow leg portion including: a first slow-leg transistor coupled between the positive output and a slow-leg switch node; and a second slow-leg transistor coupled between the slow-leg switch node and the negative output; a filter leg including: a first EMI capacitor coupled between the positive output and a slow-leg switch node; and a second EMI capacitor coupled between the slow-leg switch node and the negative output; and a bulk output capacitor coupled between the positive output and the negative output.

In some aspects, the techniques described herein relate to a power factor correction (PFC) system, wherein the controller is further configured to: detect a light load condition of a load coupled between the positive output and the negative output; and disable the first slow-leg transistor and the second slow-leg transistor.

In some aspects, the techniques described herein relate to a power factor correction (PFC) system, wherein the pulse sequence includes a plurality of pulses having substantially equal duty cycles.

In some aspects, the techniques described herein relate to a controller for a power factor correction (PFC) circuit, the controller configured to: detect that a line voltage received at the PFC circuit is in a negative half cycle; transmit a PWM signal to a first transistor of a fast-leg portion of the PFC circuit for a conversion process corresponding to the negative half cycle, the conversion process generating a bulk voltage at an output of the PFC circuit; detect that the line voltage is at a first polarity change; pause the PWM signal; and transmit a pulse sequence to a second transistor of the fast-leg portion of the PFC circuit to change a voltage on an EMI capacitor from a first voltage corresponding to the negative half cycle to a second voltage corresponding to a positive half cycle.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

A totem pole power factor correction (i.e., PFC) circuit is a circuit that is configured to efficiently deliver a regulated DC voltage to a load based on an AC voltage at its input. These circuits are often found in high-power applications (e.g., vehicle EV chargers). It may be desirable to adapt these circuits to lower power consumer applications (e.g., USB-C power delivery (PD) chargers). To conform with industry standards for consumer electronics, it may be necessary to (i) reduce electromagnetic interference (EMI) and (ii) disable a portion of the PFC circuit to reduce power consumption in certain modes of operation. Accommodating both these requirements may lead to a scenario in which the output of the PFC circuit becomes unregulated and rises to a peak voltage above the power rating of its devices (i.e., over voltage). This scenario can be caused by a response of EMI circuitry to a low-power mode (e.g., skip mode) of operation. The present disclosure describes systems and methods for controlling a PFC circuit to reduce this over-voltage when operating in a low-power mode, while still conforming to EMI requirements when operating in a normal mode (e.g., CCM mode, CrM mode).

Figure 1:
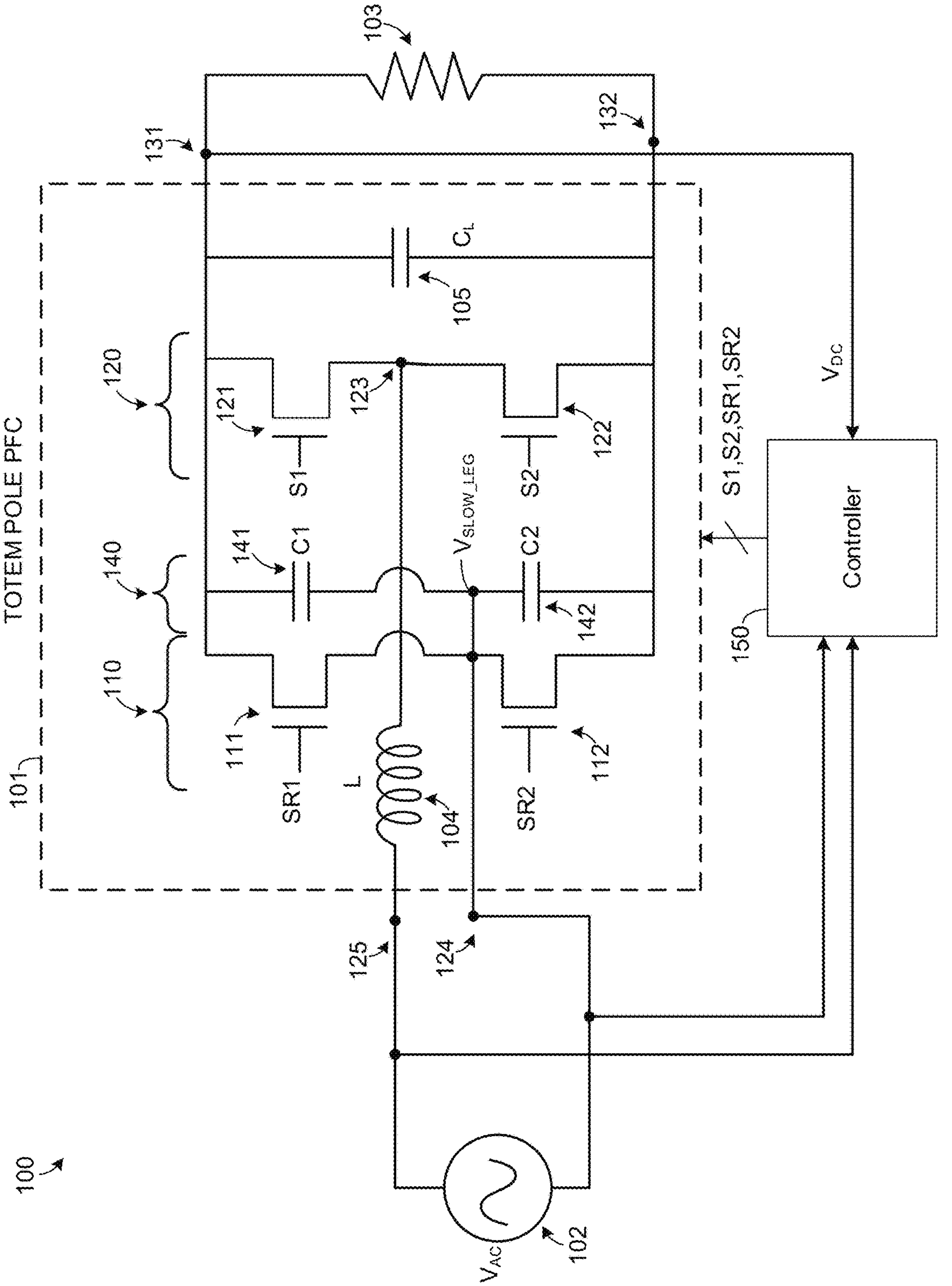
FIG. 1 illustrates a PFC system according to a possible implementation of the present disclosure.

FIG. 1 illustrates a PFC system according to a possible implementation of the present disclosure. The PFC system 100 includes an AC source 102. For example, the AC source 102 can be a line voltage (e.g., 120 VAC@60 Hz, 230 VAC @50 Hz, etc.). The PFC system 100 further includes a load 103. The load can be a DC-DC converter, such as used in a battery charging system. The PFC system 100 further includes a totem pole PFC (i.e., PFC 101) that is configured to transform the AC voltage ($V_{AC}$) (i.e., line voltage) at its input to a DC voltage ($V_{DC}$) (i.e., bulk voltage) at its output (e.g., 400V). While the DC voltage can be regulated, the current supplied to the load may vary based on a load condition.

A heavy-load condition may correspond to a low load resistance (e.g., $R_L<100\Omega$), while a low-load condition may correspond to a high load resistance (e.g., $R_L$>1000Ω. In a high-load condition, the load 103 may draw more load current ($I_L$) from the PFC 101 than the load 103 draws in the low-load condition. One type of high-load condition is a fault condition in which the load is shorted (e.g., $R_L$ approaching 0), and one type of low-load condition is a no-load condition (e.g., $R_L$ approaching ∞). In the no-load condition, the load current is at a minimum (e.g., approximately zero) which can cause the output voltage ($V_{DC}$) to increase as there is nothing to clamp a bulk voltage ($V_{DC}$) across the output bulk capacitance ($C_L$). The PFC may experience a low-load condition when the load is removed from the PFC 101. In this condition, the PFC may adjust its operation to deliver less power (i.e., a low power mode).

The PFC 101 is a totem pole topology that includes a plurality of switches that can be controlled ON/OFF. The PFC system 100 further includes a controller 150 that is configured to generate switching signals to control the ON/OFF state of each of the plurality of switches. The plurality of switches may be configured by the switching signals to form different circuit configurations that change with time to perform the transformation of $V_{AC}$ to $V_{DC}$.

The transformation may include a boost conversion process. The PFC may use a boost conversion process to output a DC level higher than a peak input voltage. For example, the PFC may output a voltage at approximately 400$V_{DC}$ (e.g., 395$V_{DC}$) for an input line voltage in a range from 90$V_{AC}$ to 264$V_{AC}$. To support the boost conversion process, the PFC 101 may include an inductor 104 (i.e., L) coupled between the AC source 102 (i.e., a positive input 125) and a fast-leg switch node 123 (i.e., fast-leg bridge node) of the PFC 101. Further, the PFC may include a bulk output capacitor 105 (i.e., $C_L$) coupled in parallel with the load 103.

In FIG. 1, the PFC 101 is shown as including the inductor 104 and the bulk output capacitor 105. The boundary shown (i.e., dotted line) illustrates a functional group to help understanding and is not intended to be limiting to a possible physical implementation. For example, in a practical implementation of the PFC, the inductor 104 and/or the bulk output capacitor 105 may be discrete elements.

The PFC 101 can be configured by switching signals to perform a boost conversion process. The boost conversion process may include repeatedly (i) charging the inductor 104 to increase an inductor current ($I_L$), (ii) discharging the charged inductor to charge the bulk output capacitor 105 in order to generate a DC (i.e., bulk) voltage ($V_{DC}$) for the load 103, and (iii) discharging the bulk output capacitor 105 to maintain the DC voltage ($V_{DC}$) delivered to the load 103, while recharging the inductor 104 for the next cycle.

To perform the boost conversion process, the switching signals from the controller 150 may switch one or more of the switches in the PFC at a pulse width modulated (PWM) switching frequency. The PWM switching frequency can be higher than a source frequency (i.e., line frequency) of the AC source 102. Accordingly, these switching signals may be referred to as high-frequency switching signals (i.e., PWM switching signals, boost switching signals).

The PFC 101 can be further configured by switching signals from the controller to perform a rectification process. The rectification process may include switching nodes coupled to the AC source 102. According, the switching signals for the rectification process can switch at the line frequency and therefore may be referred to as low-frequency switching signals (i.e., line switching signals, rectifying switching signals)

As mentioned, the PFC 101 includes a plurality of switches. The plurality of switches in the PFC can be implemented using transistors of various technologies, such as metal oxide semiconductor field effect transistors (MOSFET), and various types, such as N-type. In some implementations, one or more of the plurality of switches may require a low reverse recovery and therefore may utilize a wide bandgap (WBG) technology. For example, a WBG switch can be implemented using GaN HEMT or SIC FET technology. These switch examples are not intended to be limiting because the disclosed techniques can be applied to any switch suitable for ON/OFF control by signals (e.g., voltage signals, current signals) transmitted from the controller 150.

The plurality of switches can include two switching cells: A first switching cell (i.e., fast leg) may correspond to the boost conversion process and a second switching cell (i.e., slow leg) may correspond to the rectification process. Each switching cell may be configured as a half-bridge switching cell.

The PFC 101 includes a first half-bridge switching cell. The first half-bridge switching cell can be configured to receive high-frequency switching signals (S1, S2) and therefore is referred to as the fast-leg bridge (i.e., fast-leg branch). The fast-leg bridge (i.e., fast leg 120) includes a first fast-leg transistor 121 (i.e., high-side fast-leg transistor) and a second fast-leg transistor 122 (i.e., low-side fast-leg transistor). The first fast-leg transistor 121 is coupled between a positive output 131 and the fast-leg switch node 123. The first fast-leg transistor 121 can be controlled ON/OFF by a first high-frequency switching signal (S1) at its gate terminal. The second fast-leg transistor is coupled between a negative output 132 and the fast-leg switch node 123. The second fast-leg transistor 122 can be controlled ON/OFF by a second high-frequency switching signal (S2) at its gate terminal.

The fast leg 120 can be configured to switch ON/OFF at the PWM frequency. In other words, switching signals S1 and S2 can switch at a PWM frequency. The switching can configure the fast leg 120 to perform the power transfer (i.e., boost conversion) and can facilitate the power factor correction. Either the first fast-leg transistor 121 and the second fast-leg transistor 122 is driven by the controller according to the PWM signal and the transistor driven may alternate based on a polarity of the line voltage ($V_{AC}$).

The PFC 101 further includes a second half-bridge switching cell. The second half-bridge switching cell can be configured to receive low-frequency switching signals (SR1, SR2) and therefore is referred to as the slow-leg bridge (i.e., slow-leg branch). The slow-leg bridge (i.e., slow leg 110) includes a first slow-leg transistor 111 (i.e., high-side slow-leg transistor) and a second slow-leg transistor 112 (i.e., low-side slow-leg transistor). The first slow-leg transistor 111 is coupled between a positive output 131 and a slow-leg switch node 124 (i.e., slow-leg bridge node) of the PFC 101. The first slow-leg transistor 111 can be controlled ON/OFF by a first low-frequency signal (SR1) at its gate terminal. The second slow-leg transistor is coupled between a negative output 132 and the slow-leg switch node 124. The second slow-leg transistor 112 can be controlled ON/OFF by a second low-frequency signal (SR2) at its gate terminal.

The slow leg 110 is configured to switch ON/OFF at a frequency corresponding to the AC source 102. For example, low-frequency switching signals SR1 and SR2 can switch at twice the AC line frequency to configure the first slow-leg transistor 111 and the second slow-leg transistor 112 for synchronous rectification. The synchronous rectification process includes providing a high efficiency conduction path for a line current ($I_{AC}$) to return to the AC source 102. The synchronous rectification using switches can eliminate the need for a diode bridge. Accordingly, the PFC 101 may be referred to as a bridgeless totem pole PFC. Either the first slow-leg transistor 111 or the second slow-leg transistor 112 is driven ON during a half-cycle of the line voltage ($V_{AC}$), and the transistor driven ON may alternate based on a polarity of the line voltage ($V_{AC}$). The switching signal conditions for the PFC 101 summarized in TABLE 1 for a possible implementation.

TABLE 1

POSSIBLE SWITCH STATES ACCORDING TO POLARITY

| | POSITIVE $V_{AC}$ HALF-CYCLE | | NEGATIVE $V_{AC}$ HALF-CYCLE | |
|---|---|---|---|---|
| S1 | OFF | ON | **ON** | **OFF** |
| S2 | **ON** | **OFF** | OFF | ON |
| SR1 | OFF | OFF | ON | ON |
| SR2 | ON | ON | OFF | OFF |

As shown in TABLE 1, during a positive $V_{AC}$ half-cycle, the second fast-leg transistor 122 (i.e., low-side fast-leg transistor), S2, can be toggled ON/OFF according to the PWM signal and the first fast-leg transistor 121 (i.e., high-side fast-leg transistor), S1, can be toggled OFF/ON in complementary fashion for the boost conversion process. Also, during the positive $V_{AC}$ half-cycle, the second slow-leg transistor 112, SR2, can be held ON as a return path for current returning to the AC source 102 while the first slow-leg transistor 111 is held OFF.

During a positive $V_{AC}$ half-cycle, the second fast-leg transistor 122 (S2) is considered to be the PWM controlled (i.e., duty-controlled) device of the fast-leg, while the first fast-leg transistor 121 (S1) simply operates in complementary fashion. Accordingly, S2 is shown as bold text in TABLE 1 to indicate that it is the duty-controlled switch (i.e., D) during the positive $V_{AC}$ half-cycle.

As further shown in TABLE 1, during the negative $V_{AC}$ half-cycle, the first fast-leg transistor 121 (i.e., high-side fast-leg transistor), S1, can be toggled ON/OFF according to the PWM signal and the second fast-leg transistor 122 (i.e., low-side fast-leg transistor), S2, can be toggled OFF/ON in complementary fashion for the boost conversion process. Also, during the positive $V_{AC}$ half cycle, the first slow-leg transistor 111, SR1, is held ON as a source path for current transmitted from the AC source 102.

During the negative VAC half-cycle the first fast-leg transistor 121 (S1) is considered to be the PWM controlled (i.e., duty-controlled) device of the fast leg, while the second fast-leg transistor 122 (S2) simply operates in complementary fashion. Accordingly, S1 is shown as bold text in TABLE 1 to indicate that it is the duty-controlled switch (i.e., D) during the negative $V_{AC}$ half-cycle.

As shown in FIG. 1, the controller 150 may be configured to sense the positive output 131 (and/or the negative output 132) in order to determine an output voltage ($V_{DC}$). The controller 150 may be configured to adjust a frequency and/or duty-cycle of the PWM signal in order to regulate the $V_{DC}$ at a fixed value.

As shown in FIG. 1, the controller 150 may be further configured to sense the positive input 125 and the slow-leg switch node 124 (i.e., negative input) in order to determine a polarity of the line voltage ($V_{AC}$), when a change in the polarity occurs, and/or a type of polarity change (e.g., positive-to-negative, negative-to-positive). For example, the controller may be configured to determine if the AC source 102 is in a positive $V_{AC}$ half-cycle and a negative $V_{AC}$ half cycle. Based on this determination, the controller 150 may adjust the control of the switches according to the polarity of $V_{AC}$, as shown in TABLE 1. In practice, the controller 150 may be further configured to disable switching signals (i.e., drive signals) at a before and after a zero crossing of the AC line voltage ($V_{AC}$).

Figure 2:
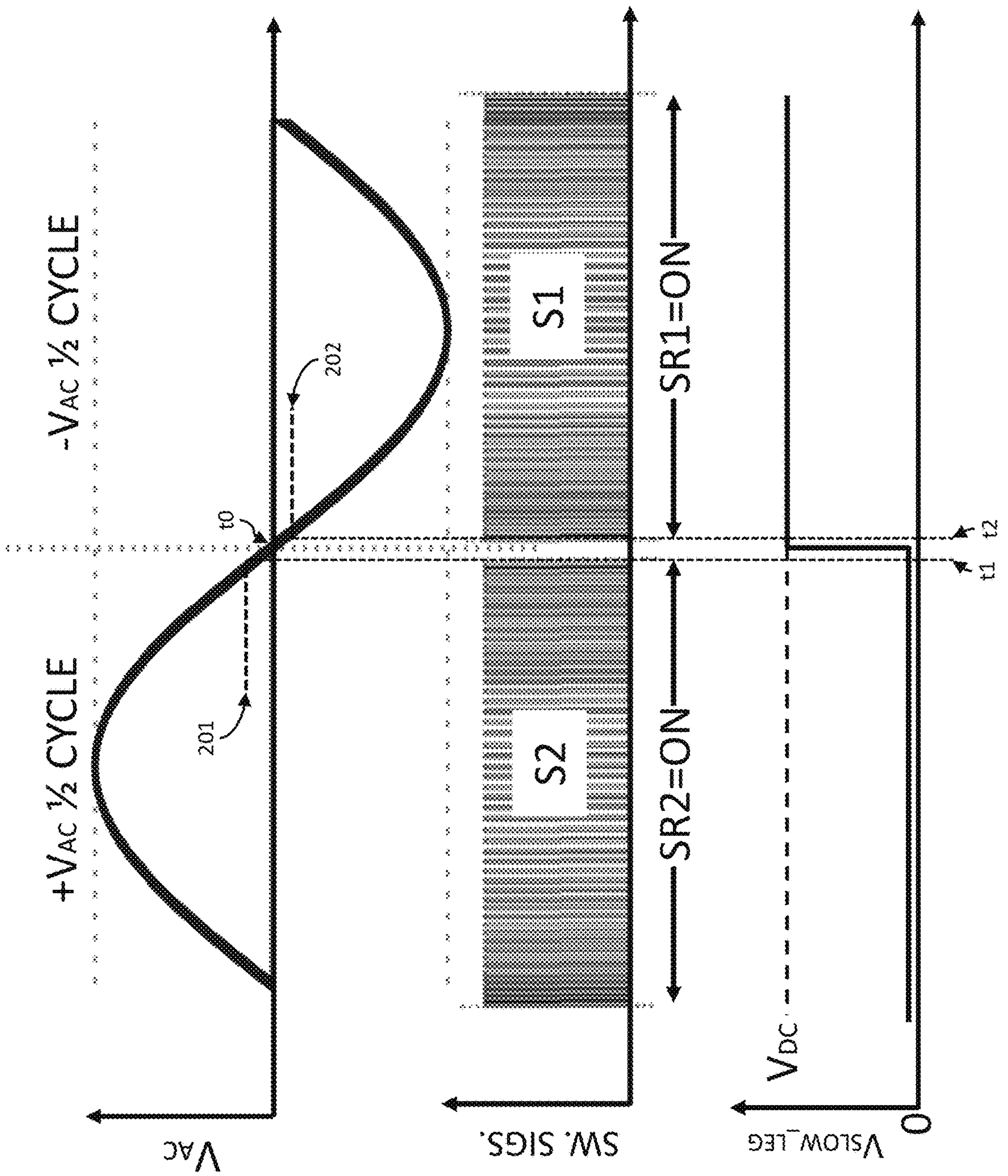
FIG. 2 illustrates a polarity change of the line voltage (VAC) and its associated change in the switching signals according to a possible implementation of the present disclosure.

FIG. 2 illustrates a polarity change of the line voltage ($V_{AC}$) and its associated change in a slow leg voltage ($V_{SLOW\_LEG}$). The polarity change may be positive-to-negative or can be negative-to-positive. FIG. 2 illustrates one period of the line voltage ($V_{AC}$) including a positive-to-negative polarity change.

As shown in FIG. 2, in the positive $V_{AC}$ half-cycle, the controller 150 may adjust a duty cycle of the (PWM) fast-leg switching signal, S2, to regulate the output voltage ($V_{DC}$) while the slow-leg switching signal, SR2, to ON. In the negative $V_{AC}$ half-cycle, the controller 150 may adjust a duty cycle of the (PWM) fast-leg switching signal, S1, to regulate the output voltage ($V_{DC}$) and can set the slow-leg switching signal, SR1, to ON.

The controller 150 may be configured to compare the line voltage ($V_{AC}$) to (programmable) line voltage thresholds in order to sense a polarity change. For example, for the transition from a positive $V_{AC}$ half-cycle to a negative $V_{AC}$ half-cycle shown, the controller may detect a start of the polarity change when the line voltage ($V_{AC}$) drops below a first threshold 201 at a first time ($t_1$), which is before a zero-crossing time ($t_0$) and detect an end of the polarity change when the line voltage drops below a second threshold 202 at a second time ($t_2$), which is after a zero-crossing time ($t_0$).

The change in polarity can lead to a large voltage change at the slow-leg switch node 124. As shown in FIG. 2, in a positive $V_{AC}$ half-cycle, the second slow-leg transistor 112 is turned ON (i.e., SR2=ON), which shorts the slow-leg switch node 124 to the negative output 132. As further shown in FIG. 2, in a negative $V_{AC}$ half-cycle, the first slow-leg transistor 111 is turned ON (i.e., SR1=ON), which shorts the slow-leg switch node 124 to the positive output 131. As mentioned, the output voltage ($V_{DC}$), which is the voltage difference between the positive output 131 and the negative output 132 can be greater than a peak line voltage (e.g., due to the boost conversion process). For example, the output voltage $V_{DC}$ may be greater than 120V (e.g., 400V). As shown in FIG. 2, a positive-to-negative line voltage polarity change can cause a voltage (i.e., $V_{SLOW\_LEG}$) at the slow-leg switch node 124 to change from approximately a ground voltage (e.g., 0±0.1 V) to approximately the output voltage ($V_{DC}$) (e.g., 400±1 V). A negative-to-positive line voltage polarity change (not shown) can cause the voltage (i.e., $V_{SLOW\_LEG}$) at the slow-leg switch node 124 to change from approximately the output voltage ($V_{DC}$) (e.g., 400V) to a ground voltage (e.g., 0V).

The large (e.g., >100V) voltage (i.e., $V_{SLOW\_LEG}$) swing may occur at a fast rate (e.g., <100 microseconds (um)) corresponding to a time required for the switching. The fast and large voltage swings may include transient signals (e.g., ringing) that can cause conducted emissions that can interfere with other circuits. In other words, the large voltage swings may cause electromagnetic interference (EMI). Accordingly, the PFC 101 includes an EMI filter leg 140 (i.e., EMI branch) to suppress the conducted emissions generated by the slow leg voltage swings at polarity changes.

The EMI filter leg 140 includes a first EMI capacitor 141 and a second EMI capacitor 142. The first EMI capacitor 141

(i.e., C1) is coupled in parallel with the first slow-leg transistor 111 and second EMI capacitor 142 (i.e., C2) is coupled in parallel with the second slow-leg transistor 112. Put another way, the first EMI capacitor (C1) may be coupled between the positive output 131 and the slow-leg switch node 124, while the second EMI capacitor (C2) may be coupled between the slow-leg switch node 124 and the negative output 132. The first EMI capacitor and the second EMI capacitor may be equal (i.e., C1=C2). The additional capacitance (e.g., $C_1=C_2=10$ nF) in parallel with the switches of slow leg 110 can reduce the conducted emissions generated by the large voltage transition at the slow-leg switch node 124.

As mentioned, control of the PFC 101 can change based on a load condition. What has been described thus far may be considered a normal mode of operation (i.e., normal mode, nominal mode, continuous conduction mode (CCM)). The PFC 101 may transition from a normal mode to a skip mode of operation (i.e., skip mode, non-PWM switching mode) when the load is sensed as being a light-load (e.g., load current below a threshold). For example, when the load ($R_L$) is removed from the PFC then the PFC 101 may be configured to operate in a skip mode.

During a low-load condition (e.g., no-load condition), and/or fault condition, the controller may disable the slow-leg. Disabling the slow leg may help to reduce power consumption (i.e., reduce a standby power). For example, the controller may transmit OFF switching signals (i.e., SR1=OFF, SR2=OFF) to turn OFF the first slow-leg transistor 111 and the second slow-leg transistor 112. In a low-load condition (e.g., no-load condition), the controller may control the switches of the fast leg according to PWM signals in a skip mode operation, however, doing so while the slow leg is disabled can charge the bulk output capacitor 105 ($C_L$) to a voltage at a level above a maximum (i.e., peak) voltage rating of the bulk output capacitor 105.

Over charging the bulk output capacitor ($C_L$) in skip mode may result from the presence of the first EMI capacitor 141 and the second EMI capacitor 142, which while necessary to reduce conducted or radiated electromagnetic emissions, can accumulate residual charge during skip mode operation. This accumulation can cause degradation and/or damage to components of the PFC (e.g., the bulk output capacitor 105).

For at least these reasons, the present disclosure describes systems and methods to charge/discharge the EMI capacitors (i.e., charge/discharge the slow-leg switch node 124) after a polarity change when the slow leg 110 is disabled to prevent the bulk output capacitor 105 from being peak charged to a voltage above a desired value (e.g., above a maximum voltage rating) when the PFC is operated in a skip mode (e.g., when a load is removed from the PFC).

Figure 3:
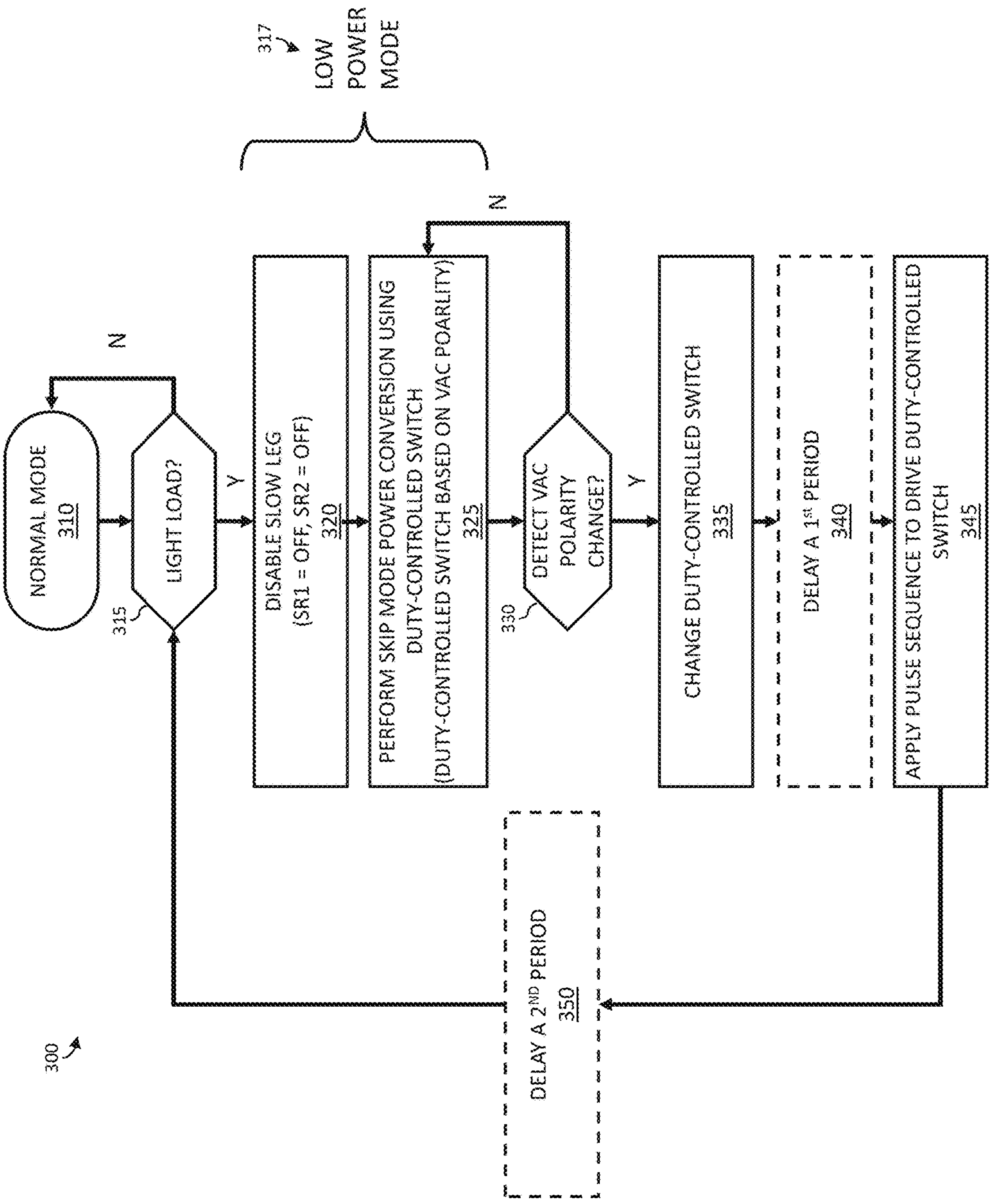
FIG. 3 is a flow chart of a method for controlling switches in a PFC system in a low-power mode of operation according to a possible implementation of the present disclosure.

FIG. 3 is a flow chart of a method for controlling switches in a PFC system in a low-power mode of operation. The method can be implemented by the PFC system 100 shown in FIG. 1. For example, one or more of the method steps (operations) may be carried out by a processor (e.g., microcontroller) configured by instructions retrieved from a non-transitory computer readable memory.

The method 300 includes determining if the PFC 101 should be (or is) in a light load condition. For example, the PFC 101 may be operated in a normal mode 310 until a light load condition (e.g., no-load condition) is detected. For example, the controller may be configured to sense when a load is removed from the PFC 101. Upon determining the PFC 101 is in a light load condition 315, the method includes configuring a PFC circuit into a low power mode 317.

In the low power mode, the method includes disabling 320 (i.e., turning OFF) the slow leg. For example, the controller 150 may be configured to transmit OFF signals (SR1=SR2=OFF) to the first slow-leg transistor 111 and the second slow-leg transistor 112 of the PFC 101. In the low power mode 317, a skip mode can be used for power conversion. Accordingly, the method 300 further includes performing 325 a skip mode conversion (e.g., boost conversion) using the duty-controlled switch. This includes switching a duty-controlled switch of the fast leg according to a PWM signal and switching the other switch of the fast leg in complementary fashion. The duty-controlled switch may be determined based on the polarity of the line voltage ($V_{AC}$). Accordingly, this step in the process may include determining a polarity of the line voltage ($V_{AC}$) and based on the polarity selecting the duty-controlled switch. As shown in TABLE 1, in a positive half-cycle of VAC (i.e., positive polarity), the duty-controlled switch is the second fast-leg transistor 122, and in the negative half-cycle of VAC (i.e., negative polarity), the duty-controlled switch is the first fast-leg transistor 121.

The method 300 further includes detecting 330 a polarity change in the line voltage ($V_{AC}$). For example, an amplitude of the line voltage ($V_{AC}$) may be sensed (e.g., by the controller) to detect a zero crossing. The polarity change may occur at a time ($t_0$) corresponding to the zero crossing (see FIG. 2).

When a line voltage ($V_{AC}$) polarity change is detected, the method 300 further includes changing 335 the duty-controlled switch. This operation may include determining a type of polarity change and then changing based on the type. The type of polarity change may be positive-to-negative, in which case the duty-controlled switch may be changed from the second fast-leg transistor 122 (S2) to the first fast-leg transistor 121 (S1). The type of polarity change may be negative-to-positive, in which case the duty-controlled switch may be changed from the first fast-leg transistor 121 (S1) to the second fast-leg transistor 122 (S2).

Figure 4A:
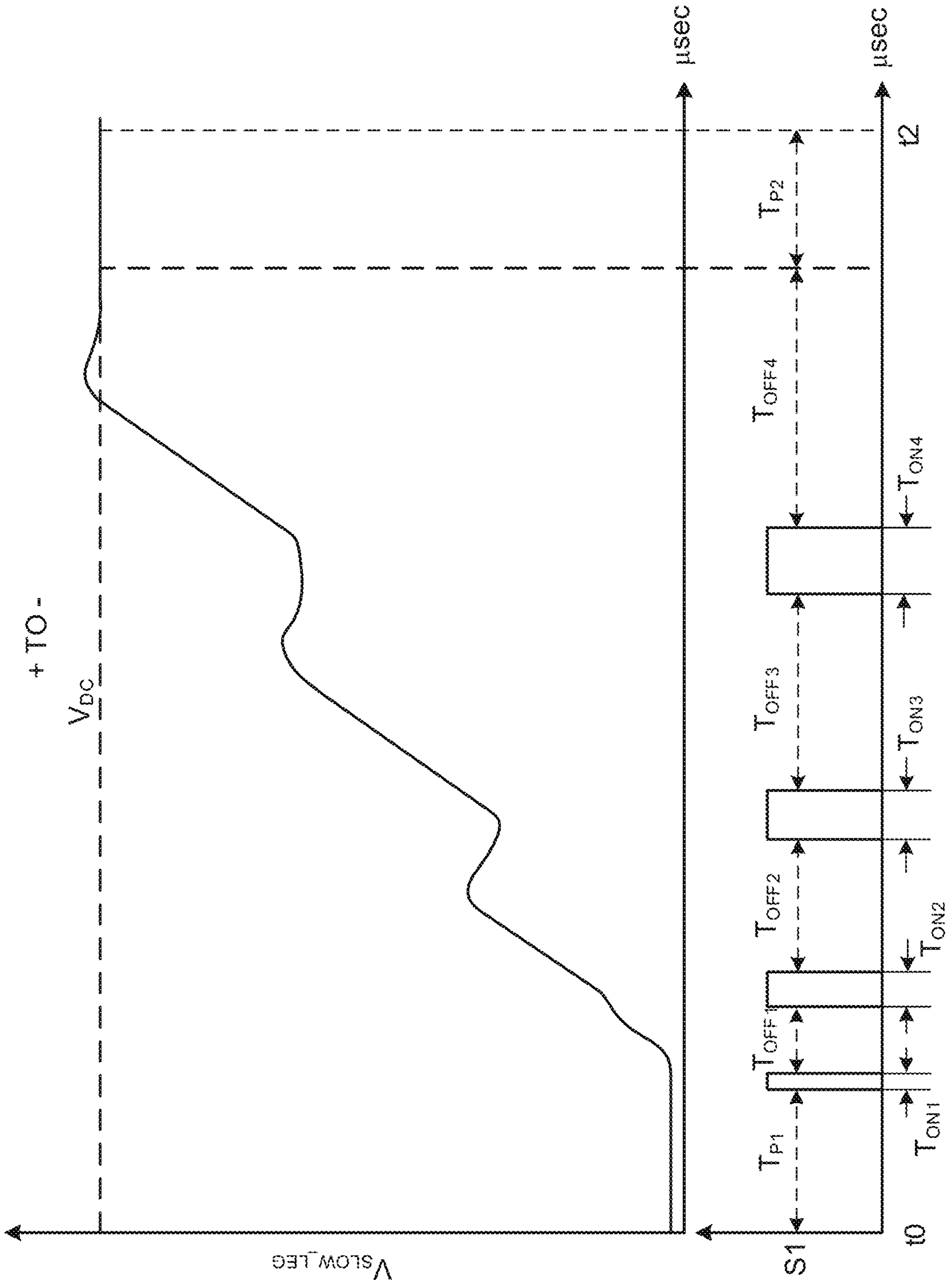
FIG. 4A are graphs illustrating the increase of a slow leg voltage resulting from a sequence of pulses applied to a duty-controlled switch of the fast leg after a polarity change in the line voltage according to a possible implementation of the present disclosure.

The method 300 further includes applying 345 (i.e., transmitting) a sequence of pulses (i.e., pulse sequence) to the duty-controlled switch. For example, the controller may be triggered to transmit (i.e., couple) the pulse sequence to a controlling terminal (e.g., gate terminal) of the duty-controlled transistor of the fast leg. The pulse sequence can be synchronized with the time (t0) of the polarity change (see FIG. 2) but otherwise under open-loop control. In other words, the controller may be triggered by the polarity change to transmit the pulse sequence and may receive no further feedback about the response of the system to the pulses. Accordingly, the pulse sequence may be predetermined. In a possible implementation, the method 300 includes delaying 340 (i.e., waiting, pausing) a first period (i.e., $T_{p1}$) after the polarity change (i.e., t0) before beginning to transmit the predetermined pulse sequence. In other words, an ON time (i.e., $T_{on1}$) of a first pulse in the pulse sequence, as shown in FIG. 4A, may begin after a first period (i.e., $T_{p1}$) after the polarity change (i.e., $t_0$).

After the pulse sequence is applied to the duty-controlled switch, the method 300 can include delaying 350 a second period (i.e., $T_{P2}$) before resuming with skip mode operation of the PFC. In other words, the PWM control of the duty-controlled switch in the fast leg may resume at a time (i.e., $t_2$) that is a second period after the pulse sequence has concluded.

Returning to FIG. 2, the pulse sequence may be transmitted during a PWM-free period (t0–t2) surrounding a line voltage polarity change (t0) to help a slow leg voltage at the slow-leg switch node 124 (i.e., $V_{SLOW\_LEG}$) transition and settle before PWM switching resumes for the next half-cycle. The pulse sequence is beneficial because the capacitors (C1, C2) used for EMI suppression can slow the slow-leg switch node voltage transition when the slow leg 110 is disabled. The disclosed approach enables a series of open loop drive pulses synchronized with a line voltage zero crossing when the slow leg drives have been disabled, which can occur in a non-PWM state associated with a skip mode or a fault mode.

The pulse sequence includes a plurality of switching signal pulses (e.g., binary pulses). Each pulse in the pulse sequence has a corresponding ON period and a corresponding OFF period. The pulses may be transmitted in sequence so that the OFF period of the first pulse is immediately followed by the ON period of the second pulse, and so on. The pulse sequence may further include a first period before the ON period of the first pulse in which no pulses are present and a second period after the OFF period of the last pulse in which no pulses are present.

The pulse sequence can include any number (N) of pulses. The pulses can all have the same ON period and/or OFF period; the pulses can all have different ON periods and/or OFF periods; or some, but not all, of the pulses can have the same ON period and OFF period. The details (i.e., N, ON periods, OFF periods) of the pulse sequence may be based on the capacitances (e.g., C1, C2) required charge/discharge rate.

In a possible implementation, the pulse sequence includes a number (N>1) of pulses each having a different ON period (i.e., $T_{ON}$) and OFF period (i.e., $T_{OFF}$). The ON period and OFF period for each pulse is adjusted so that all pulses are transmitted at a duty cycle (i.e., $T_{ON}/(T_{ON}+T_{OFF})$) that is the same. In other words, the pulse sequence may include a plurality of pulses having the same duty cycle. The ON period for each pulse is increased in succession so that an on period of a first pulse (i.e., $T_{ON1}$) is less than an ON period of a second pulse (i.e., $T_{ON2}$), and so on. The total period of the pulse sequence may be selected based on the timing requirements for the polarity switch. In a possible implementation the pulse sequence has a total period (i.e., duration) of less than 100 microseconds. A possible pulse sequence according to the implementation described above is summarized in TABLE 2.

TABLE 2

EXAMPLE PULSE SEQUENCE

| | $T_{ON}$ (μs) | $T_{OFF}$ (μs) | PULSE PERIOD (μs) |
|---|---|---|---|
| PULSE #1 | 1 | 4 | 5 |
| PULSE #2 | 2 | 8 | 10 |
| PULSE #3 | 3 | 12 | 15 |
| PULSE #4 | 4 | 16 | 20 |
| TOTAL | | | 50 |

Figure 4B:
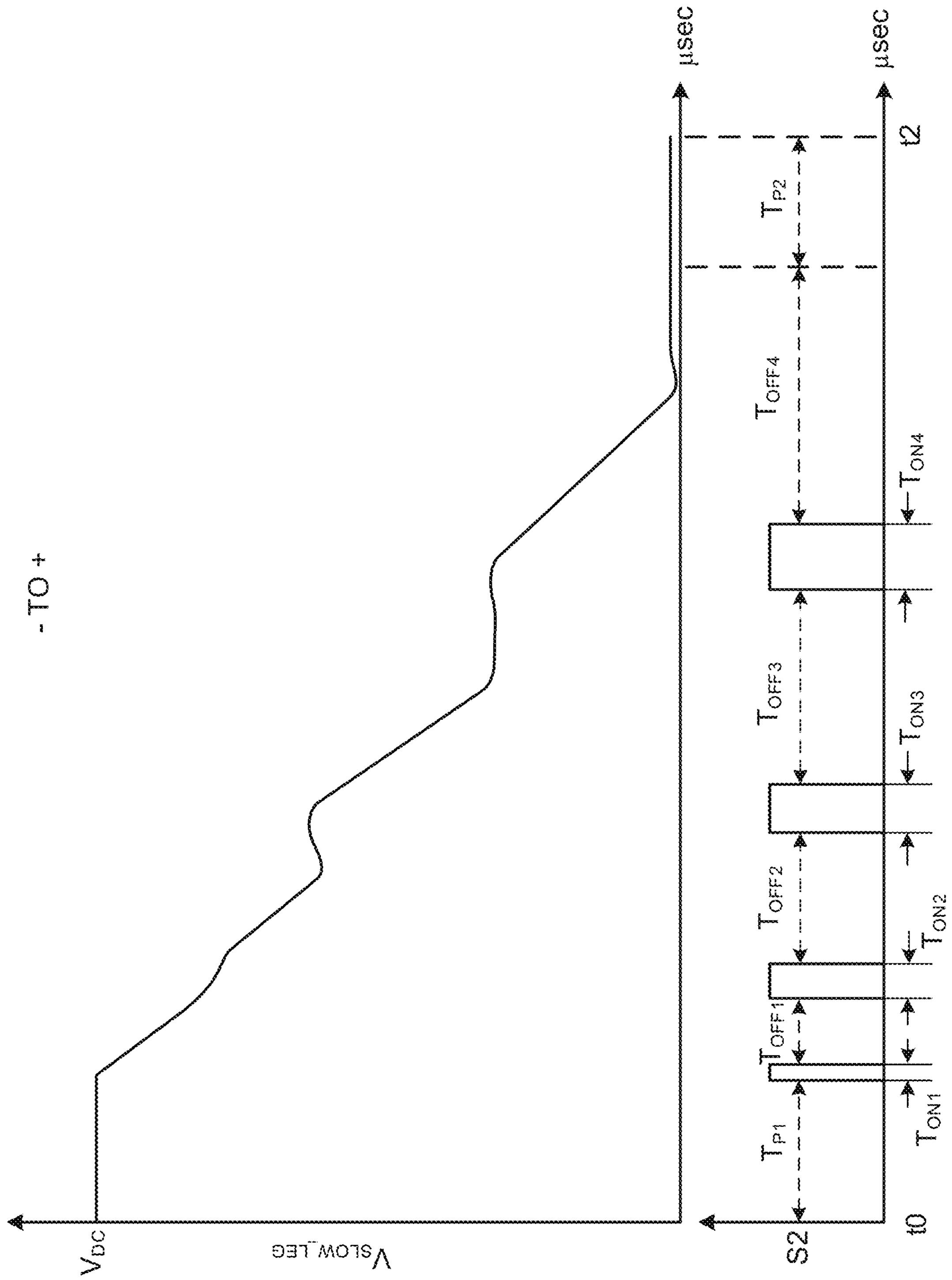
FIG. 4B are graphs illustrating the decrease of a slow leg voltage resulting from a sequence of pulses applied to a duty-controlled switch of the fast leg after a polarity change in the line voltage according to a possible implementation of the present disclosure.

FIGS. 4A and 4B include graphs illustrating a change of a slow leg voltage resulting from a sequence of pulses applied to a duty-controlled switch (of the fast leg) after a polarity change in the line voltage according to possible implementations of the present disclosure. The pulse sequence for the graphs shown correspond to pulse sequence defined in TABLE 2.

The graphs shown in FIG. 4A include a graph of the voltage ($V_{SLOW\_LEG}$) at the slow-leg switch node 124 after a positive-to-negative $V_{AC}$ polarity change at a zero-crossing time ($t_0$). Before the zero-crossing time, the slow-leg switch node 124 voltage is kept low due to the second fast-leg transistor 122 shorting the second EMI capacitor 142 (C2) during the PWM switching cycles. After the zero-crossing time ($t_0$), pulses of the pulse sequence are applied to first fast-leg transistor 121 (S1) to charge the slow-leg switch node 124 voltage ($V_{SLOW\_LEG}$) from a first voltage (e.g., a ground voltage) up to a second voltage (e.g., s bulk voltage ($V_{DC}$)). In other words, when the first half cycle is a positive half cycle and the second half cycle is a negative half cycle, the voltage on the EMI capacitor is increased from approximately a ground voltage at the output of the PFC circuit to approximately a bulk voltage at the output of the PFC circuit.

As shown in FIG. 4A, the pulse sequence starts after a first period ($T_{P1}$) after the zero-crossing time ($t_0$). Then, each pulse in the pulse sequence is turns-ON the first fast-leg transistor 121 to help charge the second EMI capacitor 142 (C2). Each pulse in the pulse sequence incrementally changes the voltage on the EMI capacitor gradually between the first voltage and the second voltage. In other words, the slow-leg switch node 124 voltage is increased incrementally by each pulse in the pulse sequence until it reaches the bulk voltage. After the voltage has been changed by the pulse sequence, a second period ($T_{P2}$) can be added before PWM switching resumes at a half-cycle start time ($t_2$). The second period may be included to help transients settle before resuming the PWM switching for conversion.

The graphs shown in FIG. 4B include a graph of the voltage ($V_{SLOW\_LEG}$) at the slow-leg switch node 124 after a negative-to-positive $V_{AC}$ polarity change at a zero-crossing time ($t_0$). Before the zero-crossing time, the slow-leg switch node 124 voltage is kept high due to the first fast-leg transistor 121 shorting the first EMI capacitor 141 (C2) during the PWM switching cycles. After the zero-crossing time ($t_0$), pulses of the pulse sequence are applied to second fast-leg transistor 122 (S2) to discharge the slow-leg switch node 124 voltage ($V_{SLOW\_LEG}$) down to the ground voltage (e.g., 0V). In other words, when the first half cycle is a negative half cycle and the second half cycle is a positive half cycle, the voltage on the EMI capacitor can be decreased from approximately a bulk voltage at the output of the PFC circuit to a ground voltage at the output of the PFC circuit.

As shown in FIG. 4B, the pulse sequence starts after a first period ($T_{P1}$) after the zero-crossing time ($t_0$). Then, each pulse in the pulse sequence is turns-ON the second fast-leg transistor 122 to help discharge the second EMI capacitor 142 (C2). Each pulse in the pulse sequence incrementally changes the voltage on the EMI capacitor by a portion of the span (e.g., $V_{DC}$—ground) between the first voltage and the second voltage. In other words, the slow-leg switch node 124 voltage is decreased incrementally by each pulse in the pulse sequence until it reaches the ground voltage. At this point, a second period ($T_{P2}$) can be added before PWM switching resumes at a half-cycle start time ($t_2$). The second period may be included to help transients settle before resuming the PWM switching for conversion.

The processes shown in FIGS. 4A and 4B may alternate continuously during skip mode operation as the line voltage alternates in polarity. Charging and discharging the EMI capacitors can help efficiency by reusing the energy used to charge the slow-leg switch node 124 for the next half cycle of operation. The pulses of the pulse sequence are under open loop control which can reduce the power consumption required by the controller for this operation. It further allows for the use of a bulk hysteresis control algorithm for optimizing no/light load efficiency.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A method comprising:

detecting that an input voltage is in a first half cycle having a first polarity;

applying a signal to a first transistor of a first portion of a circuit, the signal for a conversion process corresponding to the first half cycle; and applying a pulse sequence to a second transistor of the first portion of the circuit during a pause in the signal in response to a polarity change of the input voltage, the pulse sequence controlling the second transistor to generate a change on a voltage of a capacitor coupled to a second portion of the circuit.

2. The method according to claim 1, wherein the change generated is from a first voltage to a second voltage, wherein:

the first voltage corresponds to the input voltage in the first half cycle having the first polarity; and the second voltage corresponds to the input voltage in a second half cycle having a second polarity.

3. The method according to claim 2, wherein each pulse in the pulse sequence incrementally charges or discharges the voltage on the capacitor from the first voltage to the second voltage.

4. The method according to claim 2, wherein:

the first voltage is a ground voltage and the second voltage is approximately a bulk voltage at an output of the circuit when the polarity change of the input voltage is from a positive voltage to a negative voltage.

5. The method according to claim 2, wherein:

the first voltage is approximately a bulk voltage at an output of the circuit and the second voltage is approximately a ground voltage when the polarity change of the input voltage is from a negative voltage to a positive voltage.

6. The method according to claim 1, further comprising:

applying, after the pause, the signal to the second transistor of the first portion of the circuit; and detecting that the input voltage is in a second half cycle having a second polarity, the second polarity opposite the first polarity.

7. The method according to claim 6, wherein the pause is a first pause, the polarity change is a first polarity change, and the change is a first change, the method further comprising:

applying the pulse sequence to the first transistor of the first portion of the circuit during a second pause in the signal in response to a second polarity change of the input voltage, the pulse sequence controlling the first transistor to generate a second change on the voltage of the capacitor coupled to the second portion of the circuit.

8. The method according to claim 1, wherein:

the circuit is a power factor correction circuit;

the input voltage is an alternating-current, line voltage;

the second portion of the circuit is a half-bridge switching cell configured to generate the polarity change to rectify the alternating-current, line voltage; and the capacitor is an EMI capacitor is coupled to a switch node of the half-bridge switching cell and configured to reduce a transient signal resulting from the polarity change.

9. The method according to claim 8, further including:

detecting a low-load condition at an output of the power factor correction circuit; and disabling the half-bridge switching cell.

10. The method according to claim 1, wherein the pulse sequence includes a plurality of pulses having substantially equal duty cycles.

11. The method according to claim 10, wherein an ON period for each pulse of the plurality of pulses increases in succession in the pulse sequence.

12. The method according to claim 11, wherein the pulse sequence includes four pulses and has a duration of less than 100 microseconds.

13. The method according to claim 1, wherein the pulse sequence includes a first delay for a first period before the pulse sequence starts and a second delay for a second period after the pulse sequence ends.

14. The method according to claim 1, wherein:

the circuit is a power factor correction circuit;

the first portion of the circuit is a half-bridge switching cell including the first transistor and the second transistor coupled at a switch node; and the signal is a pulse width modulation signal configured to switch the first transistor and the second transistor ON and OFF in the conversion process to regulate an output voltage at an output of the power factor correction circuit.

15. A power factor correction (PFC) system comprising:

a voltage source configured to output a line voltage that changes a polarity at half cycles;

a circuit configured to perform a conversion process for each polarity of the line voltage, to convert the line voltage to a direct-current voltage at an output; and a controller configured to:

detect that the line voltage is in a first half cycle having a first polarity;

apply a signal to a first transistor of a first portion of the circuit to configure the first transistor to perform the conversion process corresponding to the first polarity; and apply a pulse sequence to a second transistor of the first portion of the circuit during a pause in the signal in response to a polarity change of the line voltage, the pulse sequence controlling the second transistor to generate a change on a voltage of a capacitor coupled to a second portion of the circuit.

16. The power factor correction (PFC) system according to claim 15, wherein:

each pulse in the pulse sequence incrementally charges or discharges the voltage from a first voltage to a second voltage, wherein:

the first voltage corresponds to the line voltage in the first half cycle having the first polarity; and the second voltage corresponds to the line voltage in a second half cycle having a second polarity.

17. The power factor correction (PFC) system according to claim 16, wherein the pulse sequence includes a plurality of pulses having substantially equal duty cycles, each pulse in the pulse sequence incrementally charging or discharging the voltage on the capacitor from the first voltage to the second voltage.

18. The power factor correction (PFC) system according to claim 15, wherein:

the first portion is a fast-leg, half-bridge switching-cell coupled at a fast-leg switch node to a first terminal of the voltage source via an inductor, the fast-leg, half-bridge switching-cell including the first transistor and the second transistor coupled at the fast-leg switch node;

the second portion is a slow-leg, half-bridge switching-cell coupled at a slow-leg switch-node to a second terminal of the voltage source, the slow-leg, half-bridge switching-cell including a third transistor and a fourth transistor coupled at the slow-leg switch-node that are configured OFF when the output of the circuit is in a low-load condition; and the controller is further configured to detect the low-load condition before applying the pulse sequence.

19. A controller for a PFC circuit, the controller configured to:

detect a load coupled to the PFC circuit is in a low-load condition;

disable a slow leg of the PFC circuit;

switching a fast leg of the PFC circuit to perform a conversion process on an input voltage to the PFC circuit;

detect a polarity change of the input voltage; and apply a pulse sequence to a transistor of the fast leg of the PFC circuit during a pause conversion process in response to the polarity change of the input voltage, the pulse sequence controlling the transistor to charge or discharge a capacitor coupled to the slow leg of the PFC circuit.

20. The controller for the PFC circuit according to claim 19, wherein the controller is further configured to:

resume switching the fast leg of the PFC circuit to perform the conversion process on the input voltage after applying the pulse sequence; and reapplying the pulse sequence at each polarity change of the input voltage while the low-load condition is detected.

* * * * *